S. M. MAGSBY.
TAG HOLDER.
APPLICATION FILED MAR. 24, 1917. RENEWED DEC. 8, 1917.
1,272,284.
Patented July 9, 1918.
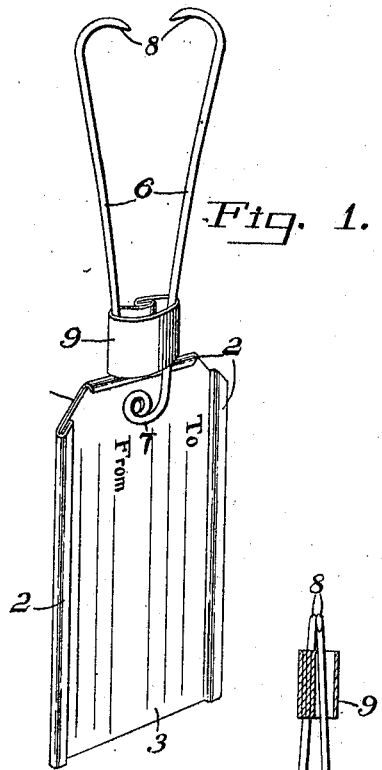
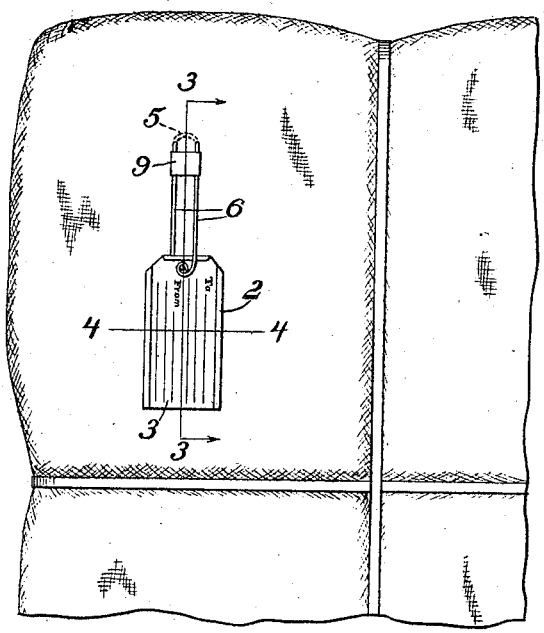
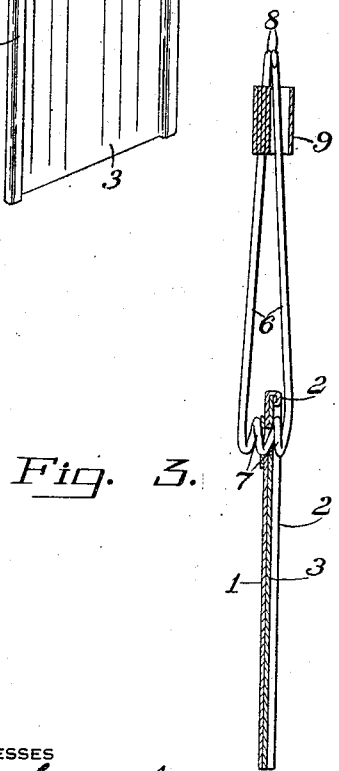
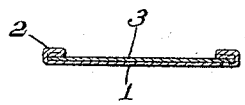
WITNESSES
INVENTOR
S. M. Magsby
BY Victor J. Evans
ATTORNEY

UNITED STATES PATENT OFFICE.

STEPHEN M. MAGSBY, OF LULA, MISSISSIPPI.

TAG-HOLDER.

1,272,284.

Specification of Letters Patent.

Patented July 9, 1918.

Application filed March 24, 1917, Serial No. 157,131. Renewed December 8, 1917. Serial No. 206,325.

*To all whom it may concern:*

Be it known that I, STEPHEN M. MAGSBY, a citizen of the United States, residing at Lula, in the county of Coahoma and State of Mississippi, have invented new and useful Improvements in Tag-Holders, of which the following is a specification.

This invention is an improved tag holder especially adapted for attaching a shipping tag or other similar tag to a bale of cotton or to a bundle or article of merchandise and for also protecting the tag so that it is not liable to become torn in transit or injured by the weather, the object of my invention being to provide an improved tag holder and attaching device of this character which is simple in construction, is strong and durable, which may be readily manufactured at low cost and by means of which a tag may be attached to a bale or bundle in such manner as to obviate risk of the tag being torn off and lost.

With the above and other objects in view the invention consists in the construction, combination and arrangement of devices hereinafter described and claimed.

In the accompanying drawings:—

Figure 1 is a perspective view of a tag holder and attaching device constructed and arranged in accordance with my invention and showing the arms of the attaching hook spread apart and in initial position.

Fig. 2 is a sectional view of the same, attached to a bale or the like.

Fig. 3 is a detailed sectional view on the plane indicated by the line 3—3 of Fig. 2.

Fig. 4 is a similar view on the plane indicated by the line 4—4 of Fig. 2.

The tag holder 1 is made of sheet metal and is provided at its sides and at the inner end with inturned flanges 2 to engage the sides and inner end of a tag 3 when the tag is placed on the holder and slipped into the grooves formed by said inturn sides and end. Near its inner end the holder has an opening which registers with the opening in the tag.

I also provide an attaching hook 5 which is made of spring wire and which comprises a pair of hook arms 6 connected together at one end by coils 7. The coils may be inserted through the openings in the tag and tag holder to attach the tag and tag holder to the hook as shown. The arms of the attaching hook normally spring apart and are provided at their free ends with reversely turned pointed bills 8. A keeper 9 is slidably mounted on the arms of the hook and forms a band through which the hook arms extend. When the keeper is moved toward the tag and tag holder the engaging ends of the hook spring apart thus permitting the bills to be embedded in a bale or bundle or to be withdrawn therefrom as desired. After the bills of the hook have been thus embedded the keeper is moved toward the billed ends of the hook serving thereby to draw the bills of the hook toward each other and hence to firmly engage them in the bale or bundle so that the device can not become casually detached therefrom.

While I have herein shown and described a preferred form of my invention I would have it understood that changes may be made in the form, proportion and construction of the several parts, without departing from the spirit of my invention and within the scope of the appended claim.

Having thus described my invention, what I claim is:—

A tag holding and attaching device comprising a spring hook having a pair of arms, coils connecting said arms together at one end and adapted to be passed through an opening in a tag, and reversely turned bills at the free ends of said arms, in combination with a keeper connecting the arms together and arranged for longitudinal slidable movement thereon to permit the bills of the hook to move apart when the keeper is moved toward the coils and to cause the bills of the hook to move toward each other when the keeper is moved toward the bills, and a tag element provided with an opening through which the coils extend, the diameter of the coils exceeding that of the opening, so that the tag element is held between two of the coils.

In testimony whereof I affix my signature.

STEPHEN M. MAGSBY.